3,386,158
METHOD OF FORMING A REFRACTORY
METAL-TO-CERAMIC SEAL
Alfred E. Milch, 461 Palmer Road, Teaneck, N.J. 07666;
Richard H. Ahlert, 29 Raymond Ave., Spring Valley,
N.Y. 10977; and Joseph J. Lalak, 122 Schrade Road,
Briarcliff Manor, N.Y. 10510
No Drawing. Continuation-in-part of application Ser. No.
364,739, May 4, 1964. This application Mar. 28, 1966,
Ser. No. 537,649
5 Claims. (Cl. 29—473.1)

This application is a continuation-in-part of application Ser. No. 364,739, filed May 4, 1964, which was granted Patent No. 3,340,025 on Sept. 5, 1967.

The invention relates to refractory ceramic-to-metal seals and methods of making the same and in particular to alternatives and improvements in the method of making such seals as disclosed in the parent application.

One of the methods disclosed and claimed in the parent application involves the formation first on the ceramic body of a tightly adherent spongy layer of molybdenum, tungsten, or a combination of both metals to form a strong mechanical bond with the ceramic. Following the formation of this spongy layer, a wetting agent in the form of an alloy of molybdenum and ruthenium, or an alloy of molybdenum and rhodium is applied to the metallized ceramic. This alloy of molybdenum and ruthenium, or molybdenum and rhodium, which is preferably formed by reducing a mixture of oxides of those metals to form an alloy thereof, not only wets the layer of spongy molybdenum, or tungsten or combination of those latter metals, but also penetrates into and fills the pores thereof.

The ceramic body, provided with a spongy layer of molybdenum, or tungsten, or combinations thereof, and having applied thereto a layer of a wetting metal which is an alloy of ruthenium and molybdenum, or rhodium and molybdenum can now be brazed to a refractory metal using a ruthenium-molybdenum alloy or a rhodium-molybdenum alloy, or less refractory brazing alloys.

We have now found that this method can be extended and improved. Thus, we have found that the layer of molybdenum which is first formed on the ceramic does not have to be spongy provided only that it is tightly adherent. Consequently, any method of applying the initial layer such as by sputtering, vacuum evaporation, or vapor phase deposition is satisfactory so long as the metallizing layer is tightly adherent.

One improvement is based upon our finding that it is not necessary to melt the wetting agent in order to render the molybdenum layer wettable.

Secondly, the braze metal may be placed directly on the layer of unfired mixed oxides of ruthenium and molybdenum, or rhodium and molybdenum which cover the underlying metallizing layer on the ceramic and fired together and in contact with the metal member so as to achieve the wetting and brazing simultaneously.

Thirdly, we have found with a high melting point braze that we can form the molybdenum layer, the layer constituting the wetting agent, and braze the ceramic to a metal body in a single step, thus combining three heating operations as disclosed and claimed in our previous application into one step.

As an example of an extension of the method disclosed in our prior application, a four (4) micron thick substantially non-porous layer of tightly adherent molybdenum was sputtered onto the end of a high purity, high density alumina cylinder. The metallized end of the cylinder was then brazed with the ruthenium-molybdenum eutectic alloy to a 0.002" thick molybdenum disc as described in application Ser. No. 364,739 to form a vacuum tight bond. This bond remained vacum tight after thermal recycling to the melting point of palladium.

As an example of the first improvement of that method we formed a tightly adherent layer of molybdenum on an alumina tube as described in application Ser. No. 364,739. A coating of $RuO_2$-$MoO_3$ corresponding to the eutectic mixture in the Ru-Mo system was applied over this and fired in a reducing atmosphere at approximately 1000° C. for a short time. It is significant to note that this temperature is more than 900° C. below the minimum melting point in the Ru-Mo system of 1945° C. Consequently, this layer does not melt. However, this piece was then joined to a 0.002" molybdenum disc using a palladium-cobalt eutectic alloy (M.P. 1235° C.) wire as the braze material. The joint was found to be vacuum tight using a helium leak detector.

As an example of the second improvement of that method we formed a tightly adherent layer of molybdenum on an alumina tube as described in application Ser. No. 364,739. A coating of $RuO_2$-$MoO_3$ corresponding to the eutectic mixture in the Ru-Mo system was applied over this molybdenum layer and the so coated tube was brazed with an alloy of cobalt (35%) and palladium (65%) to a 0.002" molybdenum disc in a single additional firing operation in a reducing atmosphere.

Finally, our further investigations have shown that a further improvement and simplification of the procedures disclosed in application Ser. No. 364,739 is possible. Thus when forming a ceramic-to-metal seal in which alloys of Ru-Mo or Rh-Mo are employed both as wetting and brazing agents, it is now possible to coalesce the three heating operations disclosed in the earlier application into one. In this case, an alumina cylinder was coated with $MoO_3$ in an amylacetate-nitrocellulose binder and air dried. A braze washer of approximately the eutectic composition of Ru-Mo was centered on a molybdenum disc mounted on a ceramic standoff in a radio frequency induction oven and the coated but unfired alumina cylinder was placed on the washer with the coating and washer in good contact and the entire assembly compressed by a suitable weight. The braze was performed in a wet hydrogen atmosphere. The resulting braze was leak tight when tested on a helium leak detector.

The latter procedure, especially, results in a considerable saving in time.

It will be understood, of course, that instead of molybdenum, tungsten or a combination thereof with molybdenum may be used as the first metal layer in all cases herein described.

While we have described our invention in connection with specific examples and applications thereof other modifications will be apparent to those skilled in this art without departing from the spirit and scope of the invention as defined in the appended claims.

What is claimed is:

1. A method of hermetically joining a refractory ceramic body to a refractory metal surface comprising the steps of forming on a portion of the surface of the ceramic body a tightly adherent spongy layer of a first refractory metal selected from the group consisting of molybdenum, tungsten, and mixtures thereof, applying a layer of a metal alloy selected from the group consisting of an alloy of ruthenium and molybdenum and an alloy of rhodium and molybdenum on the metal covered surface portion of the ceramic, heating the metal coated ceramic with the metal alloy layer thereon in a reducing atmosphere to a temperature substantially below the melting point of said alloy but at a temperature sufficient to fire the alloy into the underlying molybdenum layer, and brazing the so-called metal covered surface of the ceramic body to the refractory metal surface with a brazing alloy having a melting point substantially below that of said metal alloy.

2. A method as claimed in claim 1, in which the refractory metal wetting agent is formed in situ by reducing the corresponding metal oxides.

3. A method as claimed in claim 2, in which the application of the refractory metal wetting agent and the formation of the braze are coalesced into one heating operation.

4. A method of hermetically joining a refractory ceramic body to a refractory metal surface comprising the steps of applying to a portion of the surface of the ceramic body a layer of $MoO_3$, applying over the unfired $MoO_3$ layer a braze metal consisting of an alloy selected from the group consisting of an alloy of ruthenium and molybdenum, and an alloy of rhodium and molybdenum, placing over said unfired alloy layer the refractory metal, and heating the so-covered assembly in a reducing atmosphere to join the ceramic body to the refractory surface in a single heating operation.

5. A method as claimed in claim 4, in which the braze metal is obtained by reduction of the metal oxides in situ.

References Cited

UNITED STATES PATENTS

| | | | |
|---|---|---|---|
| 2,504,522 | 4/1950 | Greiner | 287—189.365 X |
| 2,776,472 | 1/1957 | Mesick | 29—492 X |
| 2,830,169 | 4/1958 | Medicus | 219—118.2 X |
| 2,914,640 | 11/1959 | Grattioge | 29—198 X |
| 3,107,756 | 10/1963 | Gallet | 287—189.365 |
| 3,110,101 | 11/1963 | Kieffer | 29—198 X |
| 3,132,928 | 5/1964 | Crooks | 29—198 |
| 3,276,113 | 10/1966 | Metcalfe | 29—487 |
| 3,312,539 | 4/1967 | Marshall | 29—198 |
| 3,339,267 | 9/1967 | Bronnes | 29—473.1 |
| 3,340,025 | 9/1967 | Milch | 29—195 |

OTHER REFERENCES

High Temperature Brazing, 75/172, Battelle Technical Review, volume 5, No. 8, August 1956, pages 8–12, by Robert M. Evans.

JOHN F. CAMPBELL, *Primary Examiner.*

R. F. DROPKIN, *Assistant Examiner.*